UNITED STATES PATENT OFFICE.

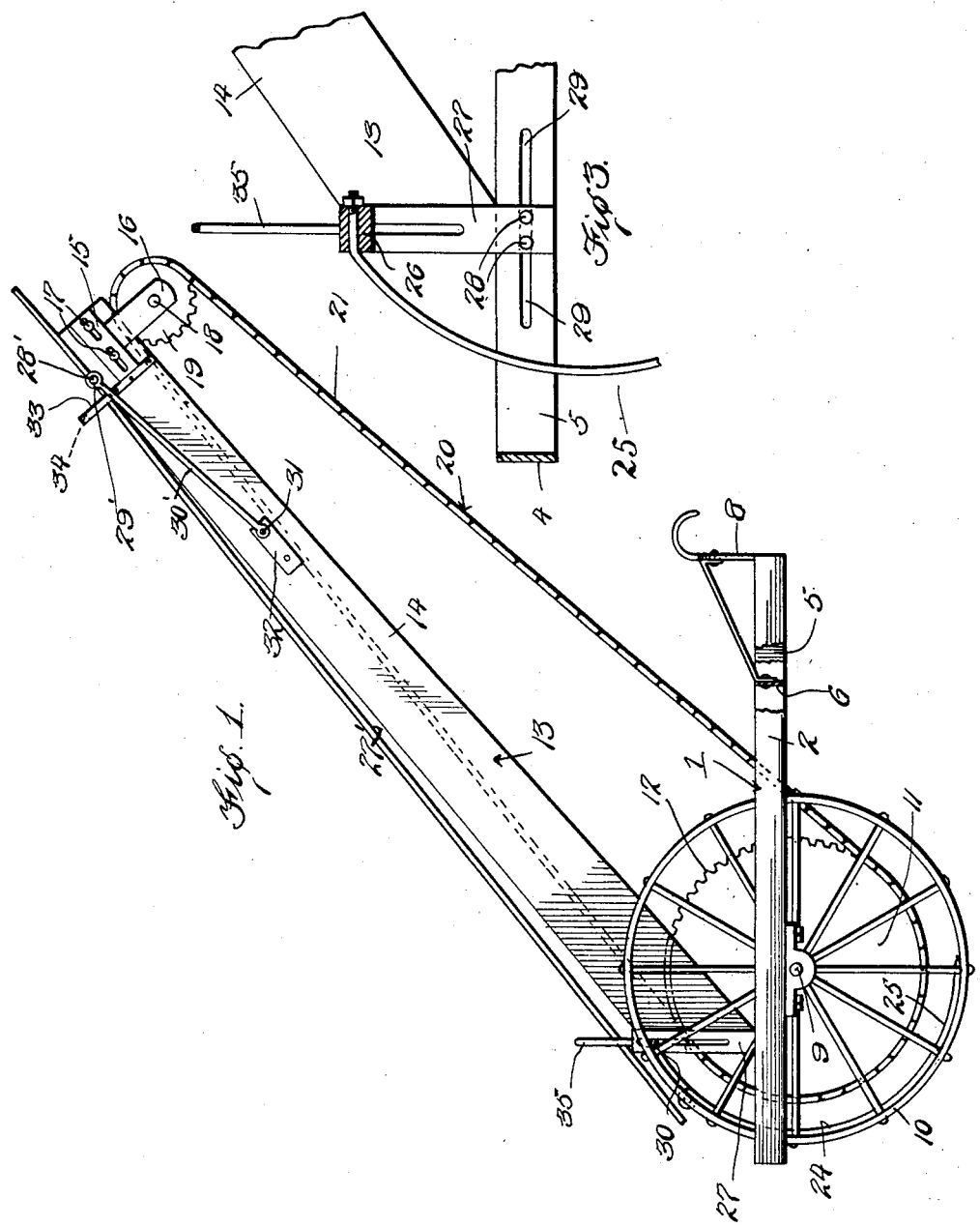

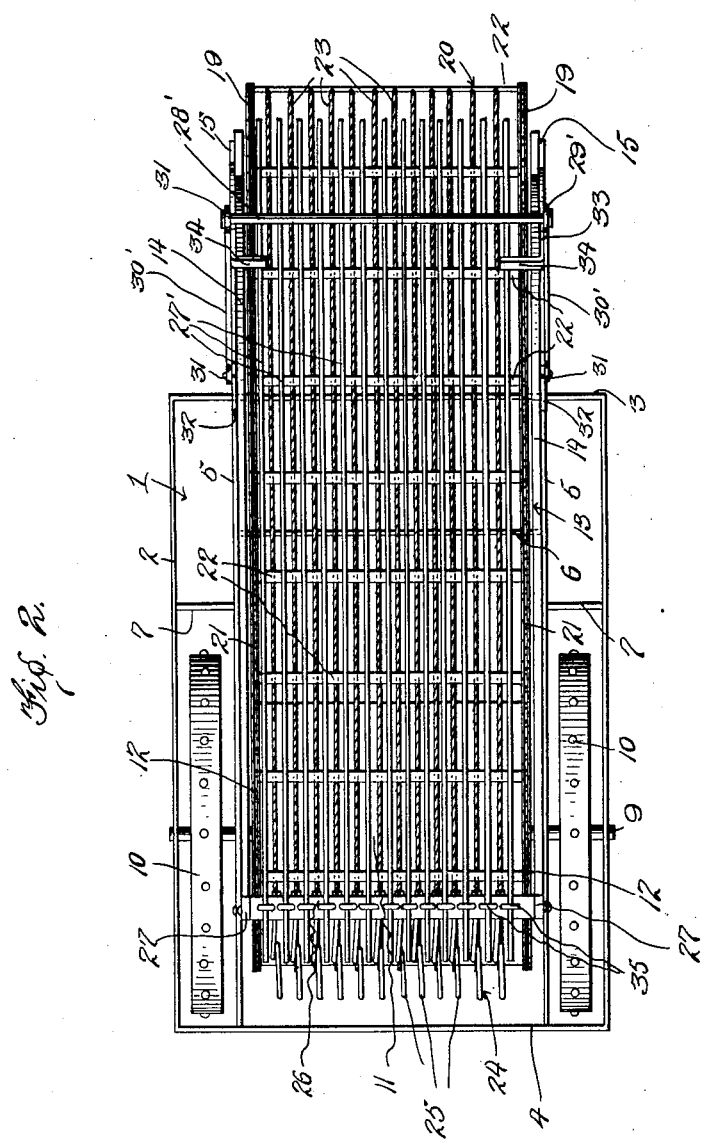

RUSSELL A. CRANDALL, OF BUTTONWILLOW, CALIFORNIA.

HAY-LOADER.

1,348,091.     Specification of Letters Patent.     Patented July 27, 1920.

Application filed November 13, 1918. Serial No. 262,324.

*To all whom it may concern:*

Be it known that I, RUSSELL A. CRANDALL, a citizen of the United States, residing at Buttonwillow, in the county of Kern and State of California, have invented new and useful Improvements in Hay-Loaders, of which the following is a specification.

This invention is an improved hay loader, to be trailed behind a wagon and to rake hay from a field and load the hay onto the wagon as the latter moves across the field, the object of the invention being to provide an improved hay loader of this class embodying improvements in the construction, combination and arrangement of the various elements and which is especially adapted for use in raking and loading alfalfa and without stripping or knocking off the leaves from the alfalfa hay.

With the above and other objects in view, the invention consists in the construction, combination and arrangement of devices hereinafter described and claimed.

In the accompanying drawings:

Figure 1 is a side elevation of a hay loader constructed and arranged in accordance with my invention.

Fig. 2 is a plan of the same.

Fig. 3 is a detail longitudinal sectional view of the rake mounting.

The main frame 1 of my improved hay loader is of oblong rectangular form and comprises outer side bars 2, front and rear cross bars 3, 4, inner side bars 5 which are spaced from the outer side bars 2, an intermediate cross bar 6 which is spaced a suitable distance from the front cross bar 3 and the bars 7 which connect the inner and outer side bars. A draft hook 8 is at the front end of the frame 1 and is adapted to be fastened to the rear end of a wagon so that the hay loader will be trailed behind the wagon and maintained in the position shown in Fig. 1. This will be better understood when it is stated that by reason of its shape the hook 8 is adapted to bear downwardly on a wagon body and thereby support the main frame 1 and the conveyer frame 13 of the loader. The said draft hook 8 is bolted or otherwise fixed to the forward end of the frame 1 so as to extend upwardly therefrom, and is connected through a diagonal brace, Fig. 1, with the intermediate cross-bar 6.

An axle shaft 9 is mounted for rotation in bearings on the under side of the main frame and at a suitable distance from the rear end thereof and said axle shaft is provided with traction wheels 10 which are arranged in the spaces between the inner and outer side bars. A drum 11 is secured on the axle shaft and rotates therewith and is provided at its ends with sprocket wheels 12. A forwardly and upwardly inclined conveyer frame 13 has its rear end secured on the rear portion of the frame 1 and comprises side members 14 which are provided at their upper, front ends with slotted plates 15. Hangers 16 are adjustably secured to the slotted plates by bolts 17 which operate in the slots of the plates. A shaft 18 is mounted in bearings in the hangers and is provided with sprocket wheels 19.

An endless conveyer 20 comprises endless sprocket chains 21 mounted on the sprocket wheels 12 and 19 and cross slats 22 which extend between and are carried by the conveyer chains.

The endless conveyer also has endless ropes of cords 23 which are arranged a suitable distance apart, and between the chains 21 and pass through openings with which the conveyer slats 22 are provided. The said conveyer cords are yieldable and serve to cushion the hay on the upper lead of the conveyer and to divide the conveyer into meshes to prevent the hay from falling through the conveyer between its side chains and slats. By adjusting the hangers, the tension of the endless conveyer can be regulated as will be understood.

The loader is also provided with a rake 24 which comprises curved spring steel rake teeth 25 and a head or cross piece 26 to which the upper ends of the rake teeth are secured. The rake teeth are arranged in rear of the drum and substantially concentric therewith and the rake head or cross piece is mounted on the main frame 1 for vertical adjustment and also for adjustment forwardly and rearwardly on the main frame. Any suitable means may be provided for thus adjustably mounting the rake. I here show the cross piece having its ends mounted in vertical slots in a pair of standards 27, the standards being adjustably bolted as at 28 to the inner bars 5 of the main frame, said bars having slots 29 through which said bolts extend and the cross piece or rake head being held in any desired vertical adjustment by means of bolts 30, Fig. 1, with which the standards are provided. Hence the rake can be set at any desired distance from the rear side of the drum and so that the points of its teeth will operate as close to the ground as may be desired.

The conveyer frame 13 is fixed to and extends upwardly and forwardly in inclined position from the standards 27; the said standards 27 being fixed as before described to the inner side bars 5 of the main frame 1.

It will be observed that the yieldable cords of the endless conveyer engage directly on the drum and it will be also observed that the endless conveyer is so constructed that there are no obstructions thereon to strike alfalfa and knock or tear the leaves therefrom.

To prevent the alfalfa from dropping or being blown from the upper, carrying lead of the conveyer, I provide a series of longitudinally arranged fender rods 27' above the conveyer and which are secured at a point near their upper ends to a cross bar 28'. The ends of the cross bar are pivotally mounted in bearing openings 29' in the front ends of a pair of arms 30', each of said arms having its rear end pivoted as at 31 on a plate 32 which is secured on the outer side of the conveyer frame. Hence, the upper ends of the fender rods are supported for gravitational movement above the conveyer and said rods bear on the alfalfa, permit the alfalfa to slide freely thereunder, offer no appreciable resistance to the passage of the alfalfa, and hence, do not knock off the alfalfa leaves or otherwise injure the alfalfa hay. To limit the upward movement of the fender rods, I provide a pair of stop standards 33 the said stop standards being secured to opposite sides of the conveyer frame and having inwardly extending arms 34 at their upper ends which extend inwardly above the outer rods 27'. The lower portions of the fender rods extend across and above the head or cross piece 26 of the rake and are arranged for vertical movement in inverted U-shaped guides 35 with which the head or cross piece of the rake is provided. It will be understood that the fender rods bear lightly on the top of the alfalfa on the conveyer and accommodate themselves to the quantity of the alfalfa on the conveyer.

While I have herein shown and described a preferred embodiment of my invention, I would have it understood that changes may be made in the construction, form and proportion of the several parts without departing from the spirit of my invention and within the scope of the appended claims.

Having thus described my invention, I claim:

1. In a machine of the class described, a main frame, supporting wheels therefor, a drum mounted for rotation with said wheels in said frame, an inclined conveyer frame, an endless conveyer engaging said drum, rake teeth arranged in rear of the drum, a fender arranged above the conveyer and for vertical movement toward and from the conveyer to accommodate itself to the quantity of material thereon, said rake teeth having a head provided with guides for said fender, standards in which said head is vertically adjustable, means adjustably fixing the head to the standards, and means adjustably fixing the standards to the main frame, whereby the rake teeth may be positioned relatively to the periphery of the drum.

2. In a machine of the class described, the combination of a main frame having longitudinally-slotted side bars, traction wheels mounted in said frame, a drum carried between and rotatable with said wheels, vertically-slotted standards, bolts extending through said slots and adjustably connecting said standards and side bars, a head, bolts extending through the slots of the standards and adjustably fixing the head thereto, and rake teeth carried by said head and carried concentrically to and spaced in rear of the periphery of the drum.

In testimony whereof I affix my signature.

RUSSELL A. CRANDALL.